United States Patent [19]

Hirano et al.

[11] 4,272,423

[45] Jun. 9, 1981

[54] TEXTILE PRINTING PASTE

[75] Inventors: Norimasa Hirano; Yuzuru Yamauchi, both of Uji, Japan

[73] Assignee: Dainippon Ink & Chemicals Inc., Tokyo, Japan

[21] Appl. No.: 79,153

[22] Filed: Sep. 26, 1979

[30] Foreign Application Priority Data

Jun. 5, 1979 [JP] Japan .................................. 54-69489
Jul. 8, 1979 [JP] Japan .................................. 54-72108
Jul. 18, 1979 [JP] Japan .................................. 54-90287

[51] Int. Cl.³ .............................................. C08L 33/04
[52] U.S. Cl. ............................... 260/29.6 TA; 106/19; 106/23; 106/32; 260/29.6 SQ; 260/33.6 UA; 260/33.8 UA; 260/42.21
[58] Field of Search ............... 260/29.6 TA, 33.6 UA, 260/33.8 UA, 42.21, 29.6 SQ; 106/19, 23, 32

[56] References Cited

U.S. PATENT DOCUMENTS

| | | | |
|---|---|---|---|
| 4,087,397 | 5/1978 | Martorano et al. | 260/29.6 TA |
| 4,089,828 | 5/1978 | Vasishth et al. | 260/29.6 TA |
| 4,100,125 | 7/1978 | Pezzuto | 260/29.6 MH |

*Primary Examiner*—Lorenzo B. Hayes
*Attorney, Agent, or Firm*—Sherman & Shalloway

[57] ABSTRACT

A textile printing paste comprising an aqueous pigment color and a stock emulsion which is a mixture in the form of an o/w emulsion consisting essentially of (A) an alkali-thickenable emulsion of a copolymer having a weight average molecular weight of at least 500,000 and being derived from
  (i) 2.5 to 40% by weight of an ethylenically unsaturated carboxylic acid containing 3 to 6 carbon atoms,
  (ii) 1 to 10% by weight of an ethylenically unsaturated monomer having one crosslinkable functional group selected from the class consisting of the group -CH$_2$OR wherein R is a hydrogen atom or an alkyl group containing 1 to 4 carbon atoms, a glycidyl group and a hydroxyl group,
  (iii) 0 to 3% by weight of a monomer having an ethylenic linkage and at least one sulfonate salt group, and
  (iv) 47 to 96.5% by weight of another monomer having an ethylenic linkage,
(B) a basic compound, and
(C) a hydrophobic organic solvent, said mixture containing 3 to 12% by weight of the copolymer and not more than 2% by weight of surface active agents.

13 Claims, No Drawings

TEXTILE PRINTING PASTE

This invention relates to a stock emulsion for use in pigment printing, especially in textile pigment printing.

As is well known, when the stock emulsion is mixed with one or more aqueous pigment colors, a colored printing paste is prepared which can be applied in the desired pattern and color to a cloth by a pigment printing technique.

The pigment printing, one type of textile printing, finds extensive use because it is not limited by the type of cloth to be printed, the printing operation is simple, and moreover, it is not costly. However, color shades obtained by the pigment printing apparently lack vividness, in contrast to dye printing, another type of textile printing, which gives very vivid shades. It has strongly been desired in the art therefore to increase the vividness of shades in pigment printing.

The colored printing paste is prepared by mixing 100 parts by weight of a stock emulsion and not more than 20 parts by weight of an aqueous pigment color although the proportions of its ingredients vary according to the desired depth of printed shades. In view of this, the present inventors thought that a solution to the problem of increasing shade vividness would lie in conventional stock emulsions.

A conventional stock emulsion is a mixture in the form of an o/w emulsion which consists of a resin emulsion called a binder, a thickener for imparting a high viscosity necessary for the printing operation, a hydrophobic organic solvent, such as mineral terpene, for imparting printability to the mixture, and an emulsifier for emulsifying the hydrophobic organic solvent in water. The emulsifier and thickener are essential ingredients, and both are surface active agents. The minimum total content of these surfactants is usually 4% by weight based on the entire mixture including water, and is never a small amount.

The present inventors first assumed that the binder and surfactants in the conventional stock emulsion will cause unvivid shades in pigment printing, and started to work on a new stock emulsion on the basis of quite a different idea from that in the conventional stock emulsion. First, the inventors found that a certain carboxyl-containing polymer obtained by emulsion polymerization is film-forming, and also has the function of emulsifying a hydrophobic organic solvent in the presence of a basic compound. Further investigation led to the discovery that an o/w emulsion of the aforesaid carboxyl-containing polymer in a specified proportion increases in viscosity upon the addition of a basic compound, and attains a high viscosity quite suitable for a printing operation. It has been found consequently that when a basic compound and a hydrophobic organic solvent are added to such an alkali-thickenable resin emulsion, a mixture is obtained which is stable despite the absence of the required amounts of surface active agents and which possesses all the properties required of a stock emulsion, and that a colored printing paste obtained by adding an aqueous pigment color to the mixture gives pigment prints of very vivid shades which can never be anticipated from the prior art. The present inventors also ascertained that the aforesaid mixture can give pigment prints of very vivid shades with full depth in spite of the fact that it contains at most as small as 2% by weight of surface active agents.

It is an object of this invention therefore to provide a novel stock emulsion whose surfactant content can be reduced to a minimum amount of 2% by weight or less, and a colored printing paste capable of giving pigment prints of very vivid shades with full depth.

The object of this invention is achieved by a stock emulsion which is a mixture in the form of an o/w emulsion consisting essentially of (A) an alkali-thickenable emulsion of a copolymer having a weight average molecular weight ($\overline{M}w$) of at least 500,000 and being derived from
  (i) 2.5 to 40% by weight of an ethylenically unsaturated carboxylic acid containing 3 to 6 carbon atoms,
  (ii) 1 to 10% by weight of an ethylenically unsaturated monomer having one crosslinkable functional group selected from the class consisting of the group —CH$_2$OR wherein R is a hydrogen atom or an alkyl group containing 1 to 4 carbon atoms, a glycidyl group

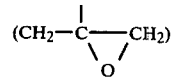

and a hydroxyl group (—OH),
  (iii) 0 to 3% by weight of a monomer having an ethylenic linkage and at least one sulfonate salt group, and
  (iv) 47 to 96.5% by weight of another monomer having an ethylenic linkage,
(B) a basic compound, and
(C) a hydrophobic organic solvent,
said mixture containing 3 to 12% by weight of the polymer and not more than 2% by weight of surface active agents.

The term "alkali-thickenable emulsion," as used herein, denotes a resin emulsion of the type in which upon the addition of a basic compound, particles of the polymer dispersed in water are swollen thereby to increase the viscosity of the emulsion greatly.

The term "weight average molecular weight," as used herein, denotes the weight average molecular weight, calculated for polystyrene, of the polymer which is determined for a solution of the polymer by gel-permeation chromatography. The polymer solution consists of 1 g of the polymer separated from the emulsion and a mixture of 50 ml of tetrahydrofuran and 50 ml of dimethylformamide.

It is not entirely clear why pigment prints of vivid colors can be obtained by using the stock emulsion of this invention. However, it is theorized that unlike the prior art, the stock emulsion contains as a main ingredient a special emulsion polymer which has the function of all of a binder, an emulsifier and a thickener, and consequently, with a colored printing paste comprising such a stock emulsion, the mechanism of pigment fixation to a fabric differs essentialy from that in the prior art, and therefore, the pigment is fixed concentratingly to the surface area of the fabric.

A stock emulsion in accordance with this invention in which the copolymer is derived from (i) 3 to 20% by weight, preferably 3 to 10% by weight, of the ethylenically unsaturated carboxylic acid, (ii) 1 to 10% by weight, preferably 1.5 to 6% by weight, of the ethylenically unsaturated monomer having a crosslinkable functional group, (iii) 0 to 3% by weight, preferably 0 to 2% by weight, of the monomer having a sulfonate salt group, and (iv) 67 to 98% by weight, preferably 82 to 95.5% by weight, of the other ethylenic monomer is very useful because a colored printing paste prepared from this stock emulsion can give pigment prints having especially good fastness characteristics such as fastness to washing and fastness to rubbing or crocking.

The alkali-thickenable emulsion can be prepared by known emulsion-polymerization methods such as a heat polymerization method or a redox polymerization method, but the redox polymerization method is most suitable.

To emulsify the resulting polymer during emulsion polymerization, the polymerizable monomer containing a sulfonate salt group (iii) can be used. As a result of using this monomer (iii), the use of anionic or nonionic surface active agents conventionally known to be used in emulsion polymerization can be obviated, and even when such surfactants are used, their amounts can be minimized. Needless to say, a surface active agent can be used alone without using the monomer (iii). Care is required, however, not to use such a surfactant in an amount beyond the upper limit (2% by weight) of surfactants in the stock emulsion of this invention.

The emulsion polymer has generally a weight average molecular weight ($\overline{M}w$) of at least 500,000, preferably 500,000–5,000,000.

The ethylenically unsaturated carboxylic acid (i) having 3 to 6 carbon atoms serves to introduce a carboxyl group into the resulting polymer, thereby causing the resulting polymer to act as an emulsifier for the hydrophobic organic solvent, rendering the emulsion of the resulting polymer alkali-thickenable, and causing the reaction between the carboxyl group and the crosslinkable functional group to take place on a printed fabric to form a good pigment-fixed film. Examples of such a monomer are acrylic acid, methacrylic acid, itaconic acid, maleic acid, maleic anhydride, fumaric acid, and crotonic acid. From the standpoint of imparting alkali-thickenability, acrylic acid and methacrylic acid, which are monobasic acids, are preferred. Acrylic acid is especially preferred.

The ethylenically unsaturated monomer (ii) containing one crosslinkable functional group serves to introduce into the resulting polymer a functional group capable of reacting with the carboxyl group so that on a printed fabric, the functional group reacts crosslinkingly with the carboxyl group to form a good pigment-fixed film. The functional group is selected from the class consisting of the group —CH$_2$OR wherein R is hydrogen or alkyl of 1 to 4 carbon atoms, a glycidyl group

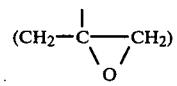

and a hydroxyl group (—OH). Examples of the ethylenically unsaturated monomer (ii) having one such functional group include N-C$_1$-C$_4$ alkoxymethyl (meth)acrylamides such as N-methylol (meth)acrylamide, N-methoxymethyl (meth)acrylamide and N-butoxymethyl (meth)acrylamide, glycidyl (meth)acrylate, beta-methylglycidyl (meth)acrylate, allyl glycidyl ether, allyl-beta-methyl glycidyl ether, and hydroxy C$_2$-C$_4$ alkyl (meth)acrylate such as beta-hydroxyethyl (meth)acrylate and beta- or gamma-hydroxypropyl (meth)acrylate. Among the aforesaid functional groups, the methylol group and alkoxymethyl groups are especially easily crosslinkable, and therefore, the use of monomers containing these groups is especially desirable.

The monomer (iii) containing an ethylenic linkage and at least one sulfonate salt group (—SO$_3$X is an alkali salt, ammonium salt or amine salt of sulfonic acid) is a copolymerizable monomer having the function of an emulsifier by itself. It serves to disperse the resulting polymer during emulsion polymerization in water and to increase the stability of the resin emulsion. Such a monomer has already been described in the general technical literature, and also in Japanese Patent Publication Nos. 36214/74, 40449/74, and 46291/74, and Japanese Laid-Open Patent Publications Nos. 56616/78 and 94285/78. Examples of the monomer (iii) are monomers containing sulfonate salt groups of the sulfostyrene type, sulfoalkyl (meth)acrylate type, sulfoalkyl (meth)acrylamide type, sulfoalkyl maleate type, and sulfoalkyl fumarate type. When the copolymer is obtained by redox emulsion polymerization, monomers there can also be used monomers having a free sulfo group (—SO$_3$H) which react with a dissociated ion attributed to a redox catalyst to form monomers having —SO$_3$X. The suitable amount of the monomer (iii) is 0.1 to 3% by weight, preferably 0.2 to 2% by weight, based on the entire monomers.

The other unsaturated ethylenically unsaturated monomer (iv) serves to impart desirable properties to the resulting polymer. Examples of such a monomer include methyl (meth)acrylate, ethyl (meth)acrylate, propyl (meth)acrylate, butyl (meth)acrylate, 2-ethylhexyl (meth)acrylate, vinyl acetate, styrene, vinyl styrene, acrylonitrile, butadiene, isoprene, ethylene glycol di(meth)acrylate, and propylene glycol di(meth)acrylate.

The types and amounts of the monomers in the alkali-thickenable emulsion are prescribed within the aforesaid ranges according to the viscosity required for a pigment printing operation. Desirably, the ethylenically unsaturated carboxylic acid is used in a minimum required amount in view of the need for obtaining an alkali-thickenable emulsion, and as regards the other monomers, to prevent a reduction in fastness, the amount of a hydrophobic monomer is maximized, and the amount of a hydrophilic monomer is minimized.

Emulsion polymerization is carried out in the same way as in ordinary emulsion polymerization. Usually, emulsion polymerization in accordance with this invention is carried out so that the proportion of the polymer in the emulsion is about 20 to 50% by weight.

It is necessary that the stock emulsion of this invention should contain 3 to 12% by weight, preferably 5 to 10% by weight, of the polymer. Accordingly, water, the basic compound and hydrophobic organic solvent should be added to the emulsion to adjust the concentration of the polymer in the stock emulsion to the aforesaid range.

The stock emulsion of this invention is obtained by mixing the aforesaid alkali-thickenable emuulsion (A) with the basic compound (B) and the hydrophobic organic solvent (C). The joint use of a surface active agent to accelerate the emulsification of the hydrophobic organic solvent is not essential. When the surfactant is used, care should be taken so that the total amount of surfactant in the stock emulsion does not exceed the specified upper limit described hereinabove. Desirably, the addition of the basic compound should precede the addition of the hydrophobic organic solvent because it is proper to neutralize the carboxyl group of the emulsion polymer by the addition of the basic compound before the addition of the hydrophobic organic solvent and to impart to this polymer the function of emulsifying the hydrophobic organic solvent to be added subsequently. The addition of the basic compound also serves to increase the viscosity of the emulsion having the polymer dispersed therein to a high viscosity required for a printing operation, usually 1000 to 200,000 centipoises in the case of an emulsion containing 20% by weight of the polymer.

The amount of the basic compound is that which is required to neutralize a part or the whole of the carboxyl groups in the emulsion polymer. Specifically, when the proportion of the ethylenically unsaturated carboxylic acid constituting the polymer is less than 30% by weight, the amount of the basic compound is that which is required to neutralize the carboxyl groups of the polymer completely, i.e. the amount required to render the acidic emulsion slightly alkaline. On the other hand, when the amount of the ethylenically unsaturated carboxylic acid is 30% by weight or more, the amount of the basic compound is that required to neutralize up to 80% of the carboxyl groups, namely the amount which maintains the emulsion slightly acidic.

Examples of suitable basic compounds for use in this invention include ammonia, ammonia water, amines such as methylamine, ethylamine, beta-hydroxyethylamine, triethanolamine, benzylamine, p-aminobenzylamine, allylamine, morpholine, 1-methyl imidazole, i-amylamine and piperidine, and alkalies such as sodium hydroxide and sodium carbonate. Use of ammonia (water) or amines is suitable for obtaining pigment prints having high fastness to rubbing in the wet state. Ammonia water is especially preferred in view of the ease of handling and the cost.

The hydrophobic organic solvent is added to control the viscosity of the emulsion, improve its flowability, and to improve the printing suitability of the emulsion in terms of, for example, the vividness of print shades and drying property. The amount of the hydrophobic organic solvent is 10 to 70% by weight based on the stock emulsion. Examples of the hydrophobic organic solvent are n-heptane, n-octane, mineral terpene, pertoleum benzine, kerosene, light oil, trichloroethylene, tetrachloroethylene, carbon tetrachloride, dichloroethane, dichloropropane, and dichlorobutane.

The stock emulsion of this invention is suitable for preparing a colored printing paste for pigment printing. The colored printing paste is prepared by mixing the stock emulsion with at least one aqueous pigment color. Known aqueous pigment colors for the preparation of colored printing pastes can be used.

The known aqueous pigment colors are aqueous mixtures prepared by dispersing pigments in water by the action of an anionic or nonionic surface active agent (usually having a pigment content of 5 to 80% by weight). Thus, the amount of the surfactant is usually 5 to 25% by weight based on the entire aqueous mixture. When such an aqueous pigment color is used in this invention, the surfactant contained in such a small amount might hamper the purpose of forming pigment prints of vivid shades. Accordingly, care must be taken in this respect. A new aqueous pigment color to be described below is obtained by dispersing a pigment in water by the action of a water-soluble polymer, and contains a very small amount of a surfactant, and therefore, it is especially suitable for the object of this invention. This desirable aqueous pigment color used in this invention consists essentially of (1) a pigment, and (2) an aqueous solution of a water-soluble resin which is a salt of a copolymer having a weight average molecular weight of 2,000 to 60,000 and being derived from
  (a) 2.5 to 30% by weight of an ethylenically unsaturated carboxylic acid having 3 to 6 carbon atoms,
  (b) 0 to 10% by weight of an ethylenically unsaturated monomer having one crosslinkable functional group selected from the class consisting of the group —CH$_2$R wherein R is a hydrogen atom or an alkyl group containing 1 to 4 carbon atoms, a glycidyl group

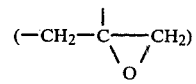

and a hydroxyl group (—OH), and
  (c) 60 to 97.5% by weight of another ethylenically unsaturated monomer.

Preferably, the water-soluble resin used in the aqueous pigment color is a salt of a copolymer prepared from 5 to 25% by weight of the monomer (a), 0 to 5% by weight of the monomer B, and 70 to 95% by weight of the monomer (c), and having a weight average molecular weight of 5,000 to 40,000.

The water-soluble resin in the aqueous pigment color may be produced by (1) a method which comprises preparing a polymer having a free carboxyl group from the monomers (a), (b) and (c) by an emulsion polymerization technique, a solution polymerization technique, etc. and adding a basic compound to form a salt, thereby rendering the polymer water-soluble, or (2) a method which comprises preparing a carboxylic acid salt monomer from a basic compound and an ethylenically unsaturated carboxylic acid, and polymerizing it in solution with the other monomers to form a water-soluble polymer. From the standpoint of the ease of preparation, method (1) is preferred. Any known methods can be used in performing emulsion polymerization, but a redox polymerization method is most suitable. In the emulsion polymerization, an ethylenically unsaturated monomer having a sulfonate salt group or a known surface active agent may be used to obtain the advantages described hereinabove with regard to the production of the alkali-thickenable emulsion.

The ethylenically unsaturated carboxylic acid (a), one monomer constituting the water-soluble resin, reacts with the basic compound to render the resulting polymer water-soluble, and introduces into the polymer a carboxyl group which participates in a crosslinking reaction at the time of forming a pigment-fixed film on a printed fabric. All acids of this type which have been described hereinabove with regard to the alkali-thickenable emulsion can be used. Among them, methacrylic acid, itaconic acid, maleic acid and fumaric acid are especially preferred.

The ethylenically unsaturated monomer (b) having a crosslinkable functional group is used to introduce the functional group reactive with a carboxyl group. As the ethylenically unsaturated monomer (b) having a crosslinkable functional group and the other ethylenically unsaturated monomer (c), the same compounds as exemplified hereinabove with regard to the monomers constituting the alkali-thickenable emulsion can be used.

The monomeric composition of the water-soluble resin is very similar to that of the alkali-thickenable emulsion polymer, but these polymers are in fact different from each other. First of all, these polymers differ from each other in weight average molecular weight. Moreover, the monomeric composition of the water-soluble resin is essential for producing a water-soluble resin by the addition of a basic compound, and dispersing a pigment effectively. Accordingly, it is necessary that in determining the monomeric composition, the types and amounts of monomers to be used must be strictly chosen within the aforesaid ranges so that a water-soluble resin can be obtained.

The water-soluble resin is a salt of the copolymer derived from the aforesaid monomers. This salt is formed by using basic compounds exemplified hereinabove with regard to the alkali-thickenable emulsion. Ammonia, ammonia water, and amines are preferred as the basic compounds.

There is no particular limitation on the pigment to be dispersed in water to form the aqueous pigment color. For example, there can be used organic pigments such as water-insoluble azo pigments, polyazo condensed pigments, copper phthalocyanine pigments, vat dye-type pigments, quinacridone pigments, and dioxazine pigments; and inorganic pigments such as titanium white and carbon black.

The aqueous pigment color is prepared by mixing 100 parts by weight of the pigment with 20 to 60 parts, preferably 30 to 50 parts, by weight of the water-soluble resin (as solids). To increase the dispersion of the pigment, the mixing is desirably carried out in a ball mill, roll mill, sand mill, attriter, etc.

The pigment content of the aqueous pigment color is the same as in an ordinary aqueous pigment color, and is selected within the range of 5 to 80% by weight.

In preparing the aqueous pigment color, a surface active agent may be used. The amount of the surfactant should be that which does not hamper the advantage of the effect of this invention when preparing a colored printing paste.

The colored printing paste is obtained by mixing the stock emulsion with the aqueous pigment color. The proportion of the aqueous pigment color based on the stock emulsion should be determined according to the desired color shade. For example, when the deepest shade is desired, the amount of the aqueous pigment is about 20 parts by weight per 100 parts by weight of the stock emulsion. Addition of larger amounts does not so much change the depth of the shade obtained. In the case of a light shade, the proportion of the aqueous pigment is usually about 0.01 part by weight.

The amount of the surface active agent used in the colored printing paste should be 2% by weight at most, preferably 1% by weight at most, so as not to hamper the effects of this invention.

In preparing the stock emulsion and the colored printing paste, known adjuvants may be added in amounts which do not substantially hamper the effects of this invention. Examples of the known adjuvants include crosslinking agents (e.g., a melamine-formaldehyde precondensate and curing catalysts therefor), water-soluble polymeric pastes for viscosity adjustment (e.g., starch, gum, cellulose derivatives, sodium alginate, and polyvinyl alcohol), hydrated fine particles for improving bleeding resistance and thickenability (e.g., silica, and titanium oxide), and alkylene glycols (e.g., ethylene glycol) for reducing screen clogging and improving the vividness of print shades.

The colored printing paste of this invention, because of its superior viscosity stability, can give pigment prints of very vivid shades with good reproducibility. In particular, the colored printing paste of this invention can give prints of higher density than do conventional colored printing pastes when they have the same pigment concentration and viscosity. Good pigment prints can be obtained by printing the above colored printing paste on a fibrous article such as cotton, rayon staples, flax, wool, silk, acetate rayon, nylon fibers, polyester fibers, polyacrylonitrile fibers, and mixtures of these fibers, synthetic paper-like sheets, films, and other sheet-like materials in a desired pattern by a known printing method such as flat screen printing, roller printing, rotary screen printing, etc.; heating the print to dry it; and subjecting it to a treatment of forming a pigment-fixed film; optionally washing the print; and drying and finishing the printed product.

The following examples illustrate the present invention. All parts and percentages in these examples are by weight.

EXAMPLE 1

Stock emulsion I:

A reactor equipped with a stirrer, a thermometer and a dropping funnel was charged with 55 parts of deionized water, 0.2 part of ammonium persulfate and 0.3 part of sodium metabisulfite. They were heated to 40° C., and the inside of the reactor was purged with nitrogen gas, and a mixture of the following formulation was gradually added.

Acrylic acid—2.9 parts
N-methylol acrylamide—1.2 parts
Styrene—4.0 parts
Ethyl acrylate—10.0 parts
Butyl acrylate—14.0 parts
Polyoxyethylene nonyl phenyl ether (HLB 17.0)—0.3 part
Sodium styrenesulfonate—0.4 part
Deionized water—13.5 parts After the addition, the mixture was stirred at 45° C. for 30 minutes to form a stable resin emulsion ($\overline{M}w = 1,480,000$).

The resulting emulsion (30 parts), 0.5 part of 25% aqueous ammonia, and 20 parts of water were stirred by a homomixer, and 50 parts of mineral terpene was added to the mixture and mixed to form a stock emulsion (referred to as stock emulsion I).

EXAMPLE 2

Stock emulsion II:

A resin emulsion ($\overline{M}w = 1,550,000$) was prepared in the same way as in Example 1 except that a mixture of the following formulation was added instead of the mixture added in Example 1.

Acrylic acid—2.3 parts
N-methylol methacrylamide—0.8 part
Ethyl acrylate—14.0 parts
Butyl acrylate—14.0 parts
Polyoxyethyl nonyl phenyl ether—0.4 part
3-Sodiosulfopropyl methacrylate—0.4 part Deionized water—13.5 parts The resulting emulsion (30 parts), 0.5 part of 25% aqueous ammonia and 20 parts of water were stirred by a homomixer, and 50 parts of mineral terpene was added and mixed to form a stock emulsion (referred to as stock emulsion II).

EXAMPLE 3

Stock emulsion III:

A resin emulsion ($\overline{M}w=1,400,000$) was obtained in the same way as in Example 1 except that a mixture of the following formulation was added instead of the mixture added in Example 1.

Itaconic acid—4.6 parts
N-butoxymethyl acrylamide—0.6 part
beta-Hydroxyethyl acrylate—0.3 part
Methyl methacrylate—8.0 parts
Ethyl acrylate—15.5 parts
Butyl acrylate—3.5 parts
Polyoxyethylene nonyl phenyl ether—1.2 parts
Deionized water—13.5 parts Thirty parts of this emulsion, 1.0 part of 25% aqueous ammonia and 20 parts of water were stirred by a homomixer, and 50 parts of mineral terpene was added and mixed to prepare a stock emulsion (referred to as stock emulsion III).

EXAMPLE 4

Stock emulsion IV:

A resin emulsion ($\overline{M}w=1,450,000$) was prepared in the same way as in Example 1 except that a mixture of the following formulation was used instead of the mixture added in Example 1.

Acrylic acid—1.7 parts
N-butoxymethyl acrylamide—0.6 part
Allyl glycidyl ether—0.3 part
2-Methacrylamide 2-methylpropanesulfonate—0.3 part
Methyl methacrylate—6.0 parts
Ethyl acrylate—22.0 parts
Acrylonitrile—1.6 parts
Polyoxyethylene nonyl phenyl ether—0.3 part
Deionized water—13.5 parts Thirty parts of the emulsion, 0.5 part of 25% aqueous ammonia and 20 parts of water were stirred in a homomixer, and 50 parts of mineral terpene was added and mixed to prepare a stock emulsion (referred to as stock emulsion (V).

EXAMPLES 5 TO 8

Stock emulsions V to VIII:

Resin emulsions were prepared in the same way as in Example 1. The emulsions were mixed with 25% aqueous ammonia, water and mineral terpene to prepare stock emulsions V to VIII. The compositions of these emulsions are shown in Table 1 below.

TABLE 1

| | Stock emulsion | V | VI | VII | VIII |
|---|---|---|---|---|---|
| Composition of the resin emulsion (parts) | Acrylic acid | 2.9 | 2.9 | 2.9 | 2.9 |
| | N-methylol acrylamide | 0.7 | — | 0.6 | — |
| | N-butoxymethyl acrylamide | — | 1.2 | — | 1.1 |
| | Glycidyl acrylate | — | — | 0.3 | — |
| | Allyl glycidyl ether | — | — | — | 0.3 |
| | Sodium styrenesulfonate | 0.4 | — | — | 0.4 |
| | 3-Sodiosulfopropyl methacrylate | — | — | 0.4 | — |
| | 2-Methacrylamide-2-methylpropanesulfonate | — | 0.3 | — | — |
| | Ethyl acrylate | 15.5 | 16.5 | 16.0 | 16.0 |
| | Butyl acrylate | 10.0 | 9.0 | 9.0 | 9.0 |
| | Styrene | 3.0 | 3.0 | 3.0 | 3.0 |
| | Polyoxyethylene nonyl phenyl ether | 0.3 | 0.3 | 0.3 | 0.3 |
| | Deionized water | 68.5 | 68.5 | 68.5 | 68.5 |
| | Ammonium persulfate | 0.2 | 0.2 | 0.2 | 0.2 |
| | Sodium metabisulfite | 0.3 | 0.3 | 0.3 | 0.3 |
| | $\overline{M}w$ | 1,550,000 | 1,500,000 | 1,600,000 | 1,400,000 |
| Composition of stock emulsion (parts) | The resin emulsion | 30 | 30 | 30 | 30 |
| | 25% aqueous ammonia | 0.5 | 0.5 | 0.5 | 0.5 |
| | Water | 20 | 20 | 20 | 20 |
| | Mineral terpene | 50 | 50 | 50 | 50 |

EXAMPLE 9

Stock emulsion IX:

A reactor equipped with a stirrer, a thermometer and dropping funnels was charged with 65 parts of deionized water, and the inside of the reactor was purged with nitrogen. With stirring, the contents were maintained at 40° C. From separate dropping funnels, a mixture of the following formulation, 1 part of a 20% aqueous solution of hydrogen peroxide and 1 part of a 20% aqueous solution of Rongalit were added little by little.

The mixture was maintained at 45° C. for 30 minutes, and stirred to form a resin emulsion.

Formulation of the mixture

Methacrylic acid—5.0 parts
N-methylol acrylamide—0.4 part
Ethyl acrylate—5.0 parts
Butyl acrylate—10.0 parts
Sodium styrenesulfonate—0.2 part
Polyoxyethylene nonyl phenyl ether—0.2 part
Deionized water—13.0 parts The resulting emulsion (40 parts) was mixed with 1 part of 25% aqueous ammonia and 29 parts of water, followed by addition of 30 parts of mineral terpene. They were thoroughly stirred to form a stock emulsion (referred to as stock emulsion IX).

EXAMPLE 10

Stock emulsion X:

A resin emulsion was obtained in the same way as in Example 9 except that a mixture of the following formulation was used instead of the mixture used in Example 9. The resulting resin emulsion was mixed in accordance with the same recipe as in Example 9 to form a stock emulsion (referred to as stock emulsion X).

Methacrylic acid—7.0 parts
N-methylol acrylamide—0.4 part
Ethyl acrylate—0.3 parts
Butyl acrylate—10.0 parts
Sodium styrene sulfonate—0.2 part
Polyoxyethylene nonyl phenyl ether—0.2 part
Deionized water—13.0 parts

EXAMPLE 11

Butyl acrylate—18.0 parts
Lauryl mercaptan—0.4 part
Polyoxyethylene nonyl phenyl ether—2.0 parts
Deionized water—20.0 parts After the addition, the mixture was maintained at 45° C. for 30 minutes to form a stable emulsion for pigment dispersion ($\overline{M}w = 23{,}500$).

A mixture of the following formulation was kneaded for 6 hours by a sand grinder to prepare an aqueous pigment color (to be referred to as aqueous pigment color A) having good stability over an extended period of time.

Polyoxyethylene nonyl phenyl ether—2.0 parts
C.I. Pigments Green 7—20.0 parts
Emulsion obtained as described above—20.0 parts
25% aqueous ammonia—1.0 part
Water—57.0 parts

EXAMPLE 12

Aqueous pigment color B:

An aqueous pigment color B having good stability over an extended period of time was prepared in the same way as in Example 11 except that C.I. Pigment Red 5 was used instead of the green pigment.

EXAMPLES 13 TO 19

Aqueous pigment colors C to I:

In the same reactor as used in Example 11, an emulsion for pigment dispersion was obtained in accordance with the recipes shown in Table 2. Then, each of the mixtures having the recipes shown in Table 2 was kneaded for 6 hours by a sand grinder to prepare aqueous pigment colors C to I having good stability over an extended period of time.

TABLE 2

| | Aqueous pigment color | C | D | E | F | G | H | I |
|---|---|---|---|---|---|---|---|---|
| Composition of the emulsion (parts) | Acrylic acid | — | 3.2 | — | — | — | — | — |
| | Methacrylic acid | 8.0 | — | — | — | 4.0 | 4.0 | 4.0 |
| | Itaconic acid | — | — | 4.0 | — | — | — | — |
| | Maleic anhydride | — | — | — | 3.2 | — | — | — |
| | beta-hydroxyethyl acrylate | — | 0.4 | — | — | — | — | — |
| | Methyl methacrylate | — | — | — | — | 6.0 | — | — |
| | Ethyl acrylate | 16.0 | 18.4 | 18.0 | 18.4 | 12.0 | 18.0 | 18.0 |
| | Butyl acrylate | 16.0 | 18.4 | 18.0 | 18.4 | 18.0 | 12.0 | 16.0 |
| | Styrene | — | — | — | — | — | 6.0 | — |
| | Acrylonitrile | — | — | — | — | — | — | 2.0 |
| | Lauryl mercaptan | 0.6 | 0.6 | 0.6 | 0.6 | 0.4 | 0.4 | 0.4 |
| | Polyoxyethylene nonyl phenyl ether | 2.0 | 2.0 | 2.0 | 2.0 | 2.0 | 2.0 | 2.0 |
| | Deionized water | 57.0 | 57.0 | 57.0 | 57.0 | 57.0 | 57.0 | 57.0 |
| | Ammonium persulfate | 0.2 | 0.2 | 0.2 | 0.2 | 0.2 | 0.2 | 0.2 |
| | Sodium metabisulfite | 0.3 | 0.3 | 0.3 | 0.3 | 0.3 | 0.3 | 0.3 |
| | $\overline{M}w$ | 20000 | 19000 | 20000 | 21000 | 25000 | 23000 | 23500 |
| Composition of the aqueous pigment color (parts) | Emulsion described above | 20.0 | 20.0 | 20.0 | 20.0 | 20.0 | 20.0 | 20.0 |
| | CI Pigment Blue 15-1 | 20.0 | 20.0 | 20.0 | 20.0 | 20.0 | 20.0 | 20.0 |
| | 25μ aqueous ammonia | 2.0 | 2.0 | 2.0 | 2.0 | 1.0 | 1.0 | 1.0 |
| | Polyoxyethylene nonyl phenyl ether | 2.0 | 2.0 | 2.0 | 2.0 | 2.0 | 2.0 | 2.0 |
| | Water | 56.0 | 56.0 | 56.0 | 56.0 | 57.0 | 57.0 | |

Aqueous pigment color A:

The same reactor as used in Example 1 was charged with 37 parts of deionized water, 0.2 part of ammonium persulfate and 0.3 part of sodium metabisulfite. They were heated to 40° C., and after purging the inside of the reactor with nitrogen gas, a mixture of the following formulation was gradually added.

Methacrylic acid—4.0 parts
N-methylol acrylamide—1.5 parts
Ethyl acrylate—18.0 parts

EXAMPLE 20

Aqueous pigment color J:

A mixture of the following formulation was kneaded in a sand mill for 6 hours to form an aqueous pigment color J.

Polyoxyethylene nonyl phenyl ether—10.0 parts
C.I. Pigment Green 7—20.0 parts
Water—70.0 parts

EXAMPLE 21

A colored printing paste was prepared by mixing 90 parts of stock emulsion I with 10 parts of aqueous pigment color A, and printed on a cloth made of a 65:35 mixture of polyester/cotton using a flat screen printing machine with a 90-mesh screen. The prints were dried at 100° C. for 1 minute, and then heat-treated at 150° C. for 2 minutes to form a pigment fixed film.

EXAMPLE 22

A colored printing paste was prepared by mixing 90 parts of stock emulsion II with 10 parts of aqueous pigment color B, and printed in the same way as in Example 21.

EXAMPLE 23

A colored printing paste was prepared by mixing 90 parts of stock emulsion II with 10 parts of aqueous pigment color A, and printed in the same way as in Example 21.

EXAMPLE 24

A colored printing paste was prepared by mixing 90 parts of stock emulsion I with 10 parts of aqueous pigment color J, and printed in the same way as in Example 21.

COMPARATIVE EXAMPLE 1

The same reactor as used in Example 1 was charged with 45.5 parts of deionized water, 0.2 part of ammonium perfulfate and 0.3 part of sodium metabisulfite. They were heated to 40° C., and the inside of the reactor was purged with nitrogen gas. Then, a mixture of the following formulation was added gradually.
  Methacrylic acid—0.6 part
  N-methylol methacrylamide—0.3 part
  Ethyl acrylate—14.0 parts
  Butyl acrylate—14.0 parts
  Polyoxyethylene nonyl phenyl ether—2.0 parts
  Sodium dodecylbenzenesulfonate—0.5 part
  Deionized water—13.5 parts After the addition, the resulting mixture was maintained at 45° C. for 30 minutes to form a resin emulsion.

Separately, 3 parts of polyoxyethylene nonyl phenyl ether, 1 part of polyethylene glycol distearate and 66 parts of water were stirred by a homomixer, an 30 parts of mineral terpene was added to prepare and o/w emulsion.

A colored printing paste was prepared by mixing 10 parts of aqueous pigment color A, 27 parts of the aforesaid resin emulsion, and 63 parts of the o/w emulsion, and printed in the same way as in Example 21.

COMPARATIVE EXAMPLE 2

A colored printing paste was prepared by using aqueous pigment color J instead of aqueous pigment color A of comparative Example 1, and printed in the same way as in Example 21.

COMPARATIVE EXAMPLE 3

A comparative stock emulsion (containing 2.1% in total of surface active agents) was produced in the same way as in Example 1 except that 2.0 parts of polyoxyethylene nonyl phenyl ether was additionally used. Using the comparative stock emulsion, pigment printing was performed in the same way as in Example 21.

The pigment prints obtained in Examples 21 to 24 and Comparative Examples 1 and 2 were tested for the vividness and depth of shades (visually evaluated on a scale of three grades, excellent, good and fair), fastness to washing (by the Grey scale for assessing changes in a color fastness test), and fastness to rubbing (by the Grey scale for assessing staining in a color fastness test), and the results are shown in Table 3.

TABLE 3

|  | Example 21 | Example 22 | Example 23 | Example 24 | Comparative Example 1 | Comparative Example 2 | Comparative Example 3 |
| --- | --- | --- | --- | --- | --- | --- | --- |
| Vividness of shade | Excellent | Excellent | Excellent | Good | Fair | Fair | Fair |
| Depth of shade | Excellent | Excellent | Excellent | Excellent | Fair | Fair | Fair |
| Fastness to washing (ASTM 36-54) | 5-4 | 5-4 | 5-4 | 5-4 | 4-5 | 4-5 | 4-5 |
| Fastness to dry rubbing (ASTM 8-52) | 3-4 | 3-4 | 3-4 | 3-4 | 3 | 3 | 3 |
| Fastness to Wet rubbing (ASTM 8-52) | 4-3 | 4-3 | 4-3 | 3-4 | 2-3 | 2-3 | 2-3 |

Note: In the numerals shown in the table, "5-4" denotes a value between 5 and 4 but near 5, and "4-5" denotes a value between 5 and 4 but near 4. "3-4", "4-3", and "2-3" have the corresponding meanings. These meanings apply to the tables given below.

EXAMPLES 25 to 30

Colored printing pastes were prepared by mixing 10 parts of aqueous pigment color B with 90 parts of each of stock emulsions III to VIII, and printed in the same way as in Example 1. The resulting pigment prints were tested in the same way as shown above, and the results are shown in Table 4.

TABLE 4

| Example | 25 | 26 | 27 | 28 | 29 | 30 |
| --- | --- | --- | --- | --- | --- | --- |
| Vividness of shade | Excellent | Excellent | Excellent | Excellent | Excellent | Excellent |
| Depth of shade | Excellent | Excellent | Excellent | Excellent | Excellent | Excellent |
| Fastness to washing | 5-4 | 5-4 | 5-4 | 5-4 | 5-4 | 5-4 |
| Fastness to dry rubbing | 3-4 | 3-4 | 3-4 | 3-4 | 3-4 | 3-4 |

TABLE 4-continued

| Example | 25 | 26 | 27 | 28 | 29 | 30 |
| --- | --- | --- | --- | --- | --- | --- |
| Fastness to wet rubbing | 3–4 | 4–3 | 4–3 | 4–3 | 4–3 | 4–3 |

EXAMPLES 31 AND 32

Colored printing pastes were preparing by adding 10 parts of aqueous pigment color J to 90 parts of each of stock emulsions IX and X. Scarcely any change in the viscosity of the pastes with time was noted. Using these colored printing pastes, printing was performed on a cotton satin by flat screen printing through a 90-mesh screen. The prints were dried at 100° C. for 1 minute, and heat-treated at 150° C. for 2 minutes. The resulting prints had vivid shades full of depth.

EXAMPLES 33 TO 39

Colored printing pastes were prepared by mixing 90 parts of stock emulsion IV with 10 parts of each of aqueous pigment colors C to I, and printed in the same way as in Example 21.

The resulting pigment prints were tested, and the results are shown in Table 5.

TABLE 5

| Example | 33 | 34 | 35 | 36 | 37 | 38 | 39 |
| --- | --- | --- | --- | --- | --- | --- | --- |
| Vividness of shade | Excellent | Excellent | Excellent | Excellent | Excellent | Excellent | Excellent |
| Depth of shade | Excellent | Excellent | Excellent | Excellent | Excellent | Excellent | Excellent |
| Fastness to washing | 5–4 | 5–4 | 5–4 | 5–4 | 5–4 | 5–4 | 5–4 |
| Fastness to dry rubbing | 3–4 | 3–4 | 3–4 | 3–4 | 3–4 | 3–4 | 3–4 |
| Fastness to wet rubbing | 4–3 | 4–3 | 4–3 | 4–3 | 4–3 | 4–3 | 4–3 |

What we claim is:

1. A textile printing paste for pigment printing, consisting essentially of a stock emulsion and an aqueous pigment color, which stock emulsion is a mixture in the form of an o/w emulsion consisting essentially of
   (A) an alkali-thickenable emulsion of a copolymer having a weight average molecular weight of at least 500,000 and being derived from
      (i) 2.5 to 40% by weight of an ethylencially unsaturated carboxylic acid containing 3 to 6 carbon atoms,
      (ii) 1 to 10% by weight of an ethylenically unsaturated monomer having one crosslinkable functional group selected from the class consisting of the group —$CH_2OR$ wherein R is a hydrogen atom or an alkyl group containing 1 to 4 carbon atoms, a glycidyl group and a hydroxyl group,
      (iii) 0.1 to 3% by weight of a monomer having an ethylenic linkage and at least one sulfonate salt group, and
      (iv) 47 to 96.5% by weight of another monomer having an ethylenic linkage,
   (B) a basic compound, and
   (C) a hydrophobic organic solvent,
   said mixture containing 3 to 12% by weight of the copolymer and not more than 2% by weight of surface active agents.

2. The textile printing paste of claim 1 wherein said alkali-thickenable emulsion (A) is an emulsion of a copolymer having a weight average molecular weight of at least 500,000 and being derived from
   (i) 3 to 20% by weight of an ethylenically unsaturated carboxylic acid having 3 to 6 carbon atoms,
   (ii) 1 to 10% by weight of an ethylenically unsaturated monomer having one crosslinkable functional group selected from the class consisting of the group —$CH_2OR$ wherein R is a hydrogen atom or an alkyl group containing 1 to 4 carbon atoms, a glycidyl group and a hydroxyl group,
   (iii) 0.1 to 3% by weight of a monomer having an ethylenic linkage and at least one sulfonate salt group, and
   (iv) 67 to 96% by weight of another monomer having an ethylenic linkage.

3. The textile printing paste of claim 2 wherein said alkali-thickenable emulsion (A) is an emulsion of a copolymer having a weight average molecular weight of at least 500,000 and being derived from
   (i) 3 to 10% by weight of an ethylenically unsaturated carboxylic acid having 3 to 6 carbon atoms,
   (ii) 1.5 to 6% by weight of an ethylenically unsaturated monomer having one crosslinkable functional group selected from the class consisting of the group —$CH_2OR$ wherein R is a hydrogen atom or an alkyl group containing 1 to 4 carbon atoms, a glycidyl group, and a hydroxyl group,
   (iii) 0.1 to 3% by weight of a monomer having an ethylenic linkage and at least one sulfonate salt group, and
   (iv) 82 to 95.5% by weight of another monomer having an ethylenic linkage.

4. The textile printing paste of claim 1 wherein said ethylenically unsaturated carboxylic acid (i) is selected from the group consisting of acrylic acid, methacrylic acid, itaconic acid, maleic acid, maleic anhydride, fumaric acid and crotonic acid.

5. The textile printing paste of claim 4 wherein said ethylenically unsaturated carboxylic acid (i) is acrylic acid or methacrylic acid.

6. The textile printing paste of claim 1 wherein said ethylenically unsaturated monomer (ii) is selected from the group consisting of N—$CH_2OR$-substituted (meth)acrylamide, (beta-methyl)glycidyl (meth)acrylate, allyl (beta-methyl)glycidyl ether and hydroxyalkyl ($C_2$–$C_4$) (meth)acrylates.

7. The textile printing paste of claim 1 wherein said other monomer (iv) is selected from the group consisting of alkyl ($C_1$–$C_8$) (meth)acrylates, vinyl acetate, styrene, vinyl toluene, acrylonitrile, butadiene and isoprene.

8. The textile printing paste of claim 1 wherein said basic compound (B) is selected from ammonia, amines and alkalies.

9. The textile printing paste of claim 1 wherein said hydrophobic organic solvent (C) is selected from the group consisting of mineral terpene, petroleum benzine, kerosene, light oil, n-heptane, n-octane, trichloroethylene, tetrachloroethylene, carbon tetrachloride, dichloroethane, dichloropropane and dichlorobutane.

10. The textile printing paste of claim 1 wherein said aqueous pigment color is a composition consisting essentially of
(1) a pigment, and
(2) an aqueous solution of a water-soluble resin which is a salt of a copolymer having a weight average molecular weight of 2,000 to 60,000 and derived from
 (a) 2.5 to 30% by weight of an ethylenically unsaturated carboxylic acid containing 3 to 6 carbon atoms,
 (b) 0 to 10% by weight of an ethylenically unsaturated monomer having one crosslinkable functional group selected from the class consisting of —$CH_2OR$ wherein R is a hydrogen atom or an alkyl group containing 1 to 4 carbon atoms, a glycidyl group and a hydroxyl group, and
 (c) 60 to 97.5% by weight of another ethylenically unsaturated monomer.

11. The textile printing paste of claim 10 wherein said water-soluble resin is derived from
 (a) 5 to 25% by weight of an ethylenically unsaturated carboxylic acid having 3 to 6 carbon atoms,
 (b) 0 to 5% by weight of an ethylenically unsaturated monomer having one crosslinkable functional group selected from the class consisting of —$CH_2OR$, a glycidyl group and a hydroxyl group, and
 (c) 70 to 95% by weight of another ethylenically unsaturated monomer.

12. The textile printing paste of claim 10 wherein said ethylenically unsaturated carboxylic acid (a) is selected from the the group consisting of acrylic acid, methacrylic acid, itaconic acid, maleic acid, maleic anhydride, fumaric acid, and crotonic acid.

13. The textile printing paste of claim 10 wherein said other unsaturated monomer (c) is selected from the group consisting of alkyl ($C_1$–$C_8$) (meth)acrylates, vinyl acetate, styrene, vinyl toluene, acrylonitrile, butadiene, and isoprene.

* * * * *